(12) United States Patent
Makino et al.

(10) Patent No.: US 7,811,652 B2
(45) Date of Patent: Oct. 12, 2010

(54) FORMED ARTICLE OF CORDIERITE AND METHOD FOR MANUFACTURING THE FORMED ARTICLE

(75) Inventors: Kentaro Makino, Kuwana (JP);
Kazushige Uchiyama, Anjo (JP);
Yoshihide Segawa, Kariya (JP);
Tomohiko Nakanishi, Kariya (JP);
Yuichi Kobayashi, Toki (JP)

(73) Assignees: Denso Corporation, Kariya (JP);
Nippon Soken, Inc., Nishio (JP)

( * ) Notice: Subject to any disclaimer, the term of this patent is extended or adjusted under 35 U.S.C. 154(b) by 26 days.

(21) Appl. No.: 12/408,146

(22) Filed: Mar. 20, 2009

(65) Prior Publication Data
US 2009/0239741 A1  Sep. 24, 2009

(30) Foreign Application Priority Data
Mar. 21, 2008  (JP)  ................... 2008-074053

(51) Int. Cl.
*B32B 3/12* (2006.01)
*B01J 21/00* (2006.01)

(52) U.S. Cl. ........................ 428/116; 502/251

(58) Field of Classification Search .............. None
See application file for complete search history.

(56) References Cited

U.S. PATENT DOCUMENTS 6,203,882 B1 *  3/2001  Koike et al. ............ 428/116
2008/0057269 A1 *  3/2008  Faber et al. ............ 428/116

FOREIGN PATENT DOCUMENTS

JP       11-309380       11/1999

* cited by examiner

*Primary Examiner*—Gordon R Baldwin
(74) *Attorney, Agent, or Firm*—Nixon & Vanderhye PC (57) ABSTRACT

A formed article is made of cordierite. The cordierite has a plurality of domains and a plurality of crystal grains placed in each domain to form a domain structure. The crystal grains in each domain are substantially aligned in the same direction, and an average size of the domains ranges from 40 μm to 150 μm. The article of cordierite is formed in a honeycomb structure having a plurality of cell walls arranged in a honeycomb form, and a plurality of cells divided by the cell walls are formed. The article of cordierite has a porosity ranging from 36% to 38%, a coefficient of linear thermal expansion equal to or lower than $0.2 \times 10^6$/K and a mechanical strength equal to or higher than $60 \times 10^6$ Pa.

13 Claims, 6 Drawing Sheets

FORMED ARTICLE OF CORDIERITE AND METHOD FOR MANUFACTURING THE FORMED ARTICLE

CROSS-REFERENCE TO RELATED APPLICATION

This application is based upon and claims the benefit of priority of the prior Japanese Patent Application 2008-74053 filed on Mar. 21, 2008, so that the contents of which are incorporated herein by reference.

BACKGROUND OF THE INVENTION

1. Field of the Invention

The present invention relates to a formed article having cordierite as a main component and a method for manufacturing the formed article.

2. Description of Related Art

As a formed article having cordierite as a main component, an article of cordierite (a cordierite article) formed in a honeycomb structure is well known. This cordierite article is, for example, used as a catalytic carrier which holds catalyst in a particulate filter for purifying exhaust gas of an internal combustion engine disposed in a vehicle. This catalytic carrier is required to be light in weight and to have a characteristic for giving a low pressure loss to the exhaust gas. Therefore, thinner cell walls of the catalytic carrier formed in a honeycomb structure have been recently used.

However, as the wall thickness of the catalytic carrier is reduced, the mechanical strength of the honeycomb structure is lowered. Therefore, it is required that the cordierite article has high mechanical strength. Published Japanese Patent First Publication No. H11-309380 discloses a method for forming an article of cordierite in a honeycomb structure so as to have high mechanical strength. In this formation, the generation of pores (or pits) in cordierite formed in the amorphous phase is suppressed. Therefore, the density of the cordierite is heightened, and the mechanical strength of the cordierite article is heightened.

However, in this method, porosity of the cordierite article is reduced to 20% or less to heighten the mechanical strength. Therefore, when the cordierite article is used as a catalytic carrier receiving exhaust gas of an engine, the catalytic carrier is inferior in performance for purifying exhaust gas. Further, as the porosity is decreased, thermal expansion in the cordierite article is increased. When the cordierite article having a high thermal expansion is used as the catalytic carrier and the temperature of the catalytic carrier is considerably changed during the operation of the engine, large thermal stresses are generated in the catalytic carrier. In this case, cracks are sometimes generated in the catalytic carrier, or the catalytic carrier is sometimes broken.

Moreover, as the mechanical strength in a formed article of cordierite is increased, the cordierite article can be more stably used as a catalytic carrier.

Therefore, it is required that a formed article of cordierite has low thermal expansion and higher mechanical strength with adequate porosity.

SUMMARY OF THE INVENTION

An object of the present invention is to provide, with due consideration to the drawbacks of the conventional cordierite structure, a formed article of cordierite which has a low coefficient of thermal expansion and high mechanical strength.

According to an aspect of this invention, the object is achieved by the provision of a formed article of cordierite, the cordierite comprising a plurality of domains and a plurality of crystal grains placed in each domain to form a domain structure. The crystal grains in each domain are substantially aligned in the same direction, and an average size of the domains ranges from 40 µm to 150 µm.

With this structure of the formed article of cordierite, because the average size of the domain structures is equal to or larger than 40 µm, many microcracks are generated in the formed article of cordierite. These microcracks reduce a coefficient of thermal expansion in the formed article of cordierite.

Further, because the average size of the domain structures is equal to or smaller than 150 µm, the formed article of cordierite has high mechanical strength.

Accordingly, the formed article of cordierite can have both a low coefficient of thermal expansion and high mechanical strength.

According to another aspect of this invention, the object is achieved by the provision of a method for manufacturing a formed article of cordierite, comprising the steps of preparing a raw material for cordierite containing talc, molding the raw material in a predetermined form, drying the raw material molded in the predetermined form, and sintering the dried raw material to obtain the formed article of cordierite. The cordierite has a plurality of domains and a plurality of crystal grains placed in each domain to form a domain structure. The crystal grains in each domain are substantially aligned in the same direction, and an average size of the domains ranges from 40 µm to 150 µm. The talc is formed of macro-crystal talc. This macro-crystal talc has a plurality of diffraction peaks at the (006) crystal lattice plane, the (111) crystal lattice plane and the (132) crystal lattice plane in the X-ray diffraction. A first ratio of the intensity of the diffraction peak at the (111) crystal lattice plane to the intensity of the diffraction peak at the (006) crystal lattice plane is lower than 0.1. A second ratio of the intensity of the diffraction peak at the (132) crystal lattice plane to the intensity of the diffraction peak at the (006) crystal lattice plane is lower than 0.1.

With this method, because of the ratios lower than 0.1, flat particles of the talc are layered to form a multi-layered structure. Therefore, grains of the raw material are easily oriented in a multi-layered structure. Further, when the macro-crystal talc is chemically reacted with other components to form cordierite, water is produced. Therefore, the cordierite is formed in the liquid phase. When the cordierite is crystallized and grown in the liquid phase, crystal grains of the cordierite are easily moved in the liquid phase and are easily aligned in the same direction.

As a result, the cordierite has a plurality of domains and a plurality of crystal grains placed in each domain to form a domain structure, the crystal grains in each domain are substantially aligned in the same direction, and an average size of the domains ranges from 40 µm to 150 µm.

Accordingly, the formed article of cordierite manufactured in this method can have both a low coefficient of thermal expansion and high mechanical strength.

DETAILED DESCRIPTION OF THE PREFERRED EMBODIMENTS

Embodiments of the present invention will now be described with reference to the accompanying drawings.

First Embodiment

Figure 1:
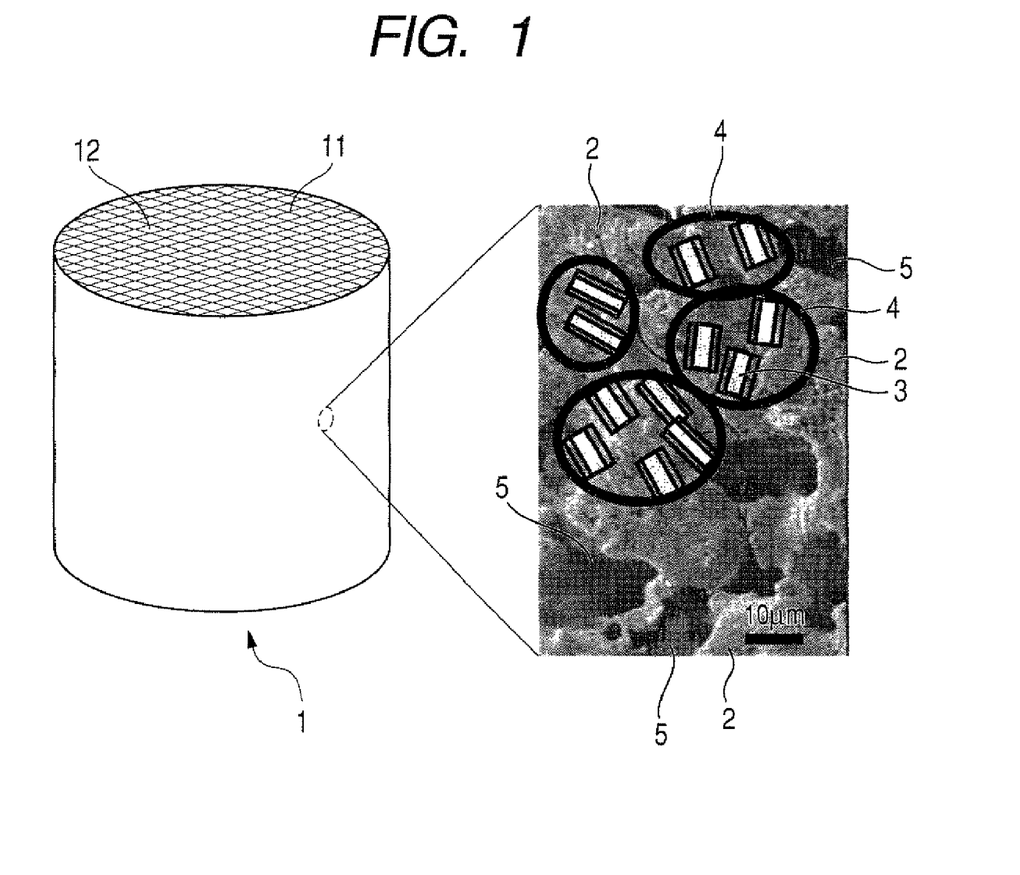
FIG. 1 is a perspective side view of an article of cordierite and an enlarged view of a portion of the cordierite article according to the first embodiment of the present invention.

FIG. 1 is a perspective side view of an article of cordierite and an enlarged view of a portion of the cordierite article according to the first embodiment.

As shown in FIG. 1, an article of cordierite (a cordierite article) 1 is, for example, formed in a honeycomb structure. More specifically, the cordierite article 1 has a plurality of cell walls 11 arranged in a honeycomb form. Each cell wall 11 has the thickness ranging from 50 to 70 μm. Therefore, a large number of cells 12 divided by the cell walls 11 are formed in the cordierite article 1. This cordierite article 1 is used as a catalytic carrier which holds catalyst in a particulate filter to purify exhaust gas of an internal combustion engine of a vehicle.

The cordierite of the article 1 has a plurality of domain structures (i.e., domains) 4 and a plurality of crystal grains 3 placed in each domain structure 4. The crystal grains 3 in each domain structure 4 are substantially aligned in the same direction, and the average size of the domain structures 4 ranges from 40 μm to 150 μm.

More specifically, the cordierite of the article 1 has a plurality of microcracks 5 to form a plurality of microstructures 2 divided by the microcracks 5, and a large number of crystal grains 3 of cordierite are formed in the microstructures of the article 1. The crystal grains 3 are in groups. The crystal grains 3 in each group are placed close to one another and are substantially aligned along the same direction. At least one group of crystal grains 3 is placed in each microstructure 2. Each group of crystal grains 3 aligned along the same direction forms one domain structure 4 in three dimensions. The aligning directions of the crystal grains 3 in the domain structures 4 are different from one another, so that the cordierite article 1 substantially has no orientation as a whole.

Figure 2:
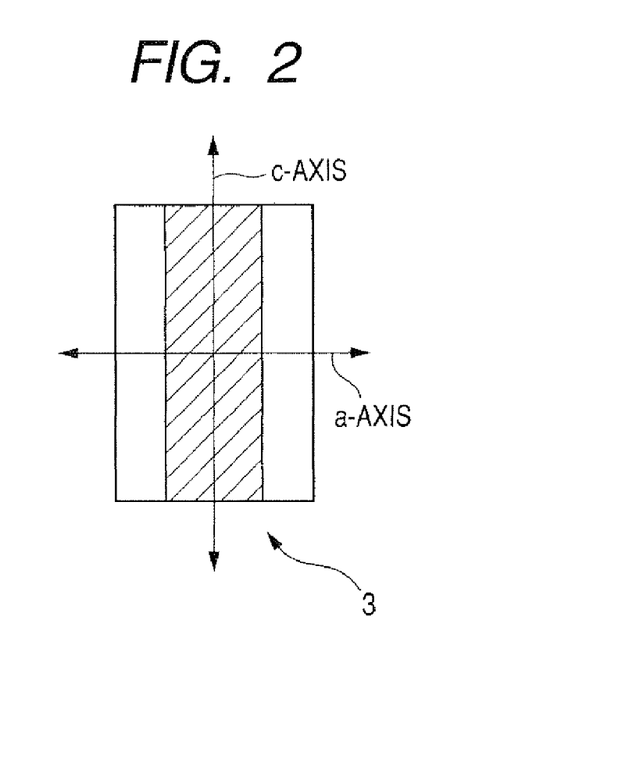
FIG. 2 is a modeling view of a crystal grain of cordierite formed in the cordierite article.

FIG. 2 is a view of the crystal grain 3 of cordierite formed in the cordierite article 1.

As shown in FIG. 2, each crystal grain 3 has a size ranging from several μm to tens μm in diameter. Each crystal grain 3 has three crystal axes (an a-axis, a b-axis and a c-axis). The b-axis is not shown in FIG. 2. Each crystal grain 3 is crystallized and grown along the three crystal axes to have three lengths in the respective crystal axes. The crystal grains 3 in each domain structure 4 are substantially aligned along the direction of the c-axis. A coefficient of thermal expansion along a direction of the c-axis is smallest in the crystal grains 3 among thermal expansion coefficients along directions of the crystal axes.

When the cordierite article 1 is used as a catalytic carrier, it is required that the cordierite article 1 has a low coefficient of linear thermal expansion of $0.2 \times 10^{-6}/K$ (K; Kelvin) (i.e., $0.2 \times 10^{-6}/°C$.) or less and high mechanical strength of $60 \times 10^6$ Pa ($Pa = Nm^{-2}$) or more at an adequate porosity ranging from 36 to 38%. The inventors of this application discovered that, when the average size of the domain structures 4 is 40 μm or more in diameter, the coefficient of linear thermal expansion in the cordierite article 1 is $0.2 \times 10^{-6}/K$ or less. Further, the inventors discovered that, when the average size of the domain structures 4 is 150 μm or less in diameter and porosity ranges from 36 to 38%, the mechanical strength of the cordierite article 1 is $60 \times 10^6$ Pa or more.

Therefore, the cordierite article 1 having porosity ranging from 36 to 38% is manufactured such that the average size of the domain structures 4 is set in a range from 40 μm to 150 μm. In this case, the cordierite article 1 has low thermal expansion in the temperature range from 40° C. to 800° C. The average of the coefficient of the linear thermal expansion in this temperature range is $0.2 \times 10^{-6}/K$ or less. Further, the cordierite article 1 has high mechanical strength of $6 \times 10^6$ Pa or more.

The reason that the cordierite article 1 having the domain structures 4 set at the average size ranging from 40 μm to 150 μm has low thermal expansion and high mechanical strength will be described in detail.

The crystal gain 3 of cordierite shown in FIG. 2 has the positive coefficient of thermal expansion along each of the a-axis and the b-axis and the negative coefficient of thermal expansion along the c-axis. Therefore, the thermal expansion coefficient along the c-axis is smallest among the thermal expansion coefficients along the crystal axes. Because of this anisotropy in the thermal expansion of the crystal gain 3, when kaolin used as raw material for cordierite is oriented and crystallized such that crystal grains 3 are oriented along the c-axis, it is well known that ceramics made of cordierite have a considerably low thermal expansion.

In addition, the inventors made an analysis of thermal expansion in cordierite as follows. That is, raw materials for cordierite are mixed with one another according to a sol mixing method, and the mixture is sintered to produce sintered cordierite. This sintered cordierite substantially has no orientation but has a high density. The inventors discovered that this sintered cordierite having no orientation but having a high density has low thermal expansion. A thermal expansion coefficient of a crystallized material is generally estimated from the motion of crystal lattices of the material movable by the thermal expansion. However, the thermal expansion coefficient of this sintered cordierite is considerably lower than the estimated thermal expansion coefficient. To ascertain the reason that this sintered cordierite has a low thermal expansion coefficient, the inventors analyzed microstructures of the sintered cordierite by means of a polarization microscope while using the birefringence of cordierite. By this analysis, the inventors discovered the follow information. A plurality of large domain structures 4 are formed in the sintered cordierite, and a plurality of primary fine grains 3 of cordierite aligned in the same direction form each domain structure 4 (see FIG. 1). The domain structures 4 influence the motion of crystal lattices formed in the cordierite to lower the thermal expansion.

To examine the relation between the average size of the domain structures 4 and the thermal expansion in the sintered cordierite, the inventors prepared many samples of sintered cordierite of which the sintering temperatures are differentiated. As a result of the examination, the inventors discovered the following information. When the average size of the domain structures 4 in the sintered cordierite is small, the thermal expansion coefficient of the sintered cordierite accords with the thermal expansion coefficient estimated from the motion of crystal lattices of the sintered cordierite. In contrast, as the average size of the domain structures 4 in the sintered cordierite becomes large, the thermal expansion coefficient of the sintered cordierite is lowered to be away from the estimated thermal expansion coefficient.

Further, the inventors discovered that microcracks exist in the sintered cordierite with large domain structures 4. Therefore, the inventors acknowledge that these microcracks in the sintered cordierite reduce the thermal expansion coefficient of the sintered cordierite. When cordierite is thermally expanded, the space between microcracks is reduced so as to reduce the thermal expansion coefficient.

From the examined relation between the average size of the domain structures 4 and the thermal expansion, when the average size of the domain structures 4 is 40 μm or more, the coefficient of the linear thermal expansion becomes $0.2 \times 10^{-6}$/K or less.

Although the thermal expansion coefficient is decreased when the average size of the domain structures 4 is increased, the mechanical strength of the sintered cordierite article is undesirably lowered when the average size of the domain structures 4 is increased. From this relation between the average size of the domain structures 4 and the mechanical strength, when the average size of the domain structures 4 is 150 μm or less, the inventors discovered that the sintered cordierite set at porosity (i.e., the volumetric ratio of pores in the cordierite) ranging from 36 to 38% has the mechanical strength of $6 \times 10^6$ Pa or more.

Therefore, to give low thermal expansion and high mechanical strength to the cordierite article 1, the average size of the domain structures 4 in the cordierite article 1 is set in a range from 40 μm to 150 μm.

The calculation of the average size of the domain structures 4 in the cordierite article 1 will be described.

To obtain a distribution of diameters of the domain structures 4, various diameters of the respective domain structures 4 in three dimensions are classified into a plurality of divisions DVi (i=1, 2, - - -, MAX, and MAX is an integer equal to or higher than 2) having the same width Wd of diameter. Each division DVi ranges from Di−Wd/2 to Di+Wd/2, and diameters of the domain structures 4 in each division DVi are represented by the diameter Di. The number of domain structures 4 in each division DVi is expressed by Ni. It is assumed that each domain structure 4 is a sphere and has a circular shape in two dimensions, so that areas of the domain structures 4 in each division DVi are represented by Si (Si=π/4× Di$^2$) in two dimensions.

The total area St(j) of the domain structures 4 in the divisions DVi (i=1, 2, - - -, j) is expressed according to the following equation.

$$St(j) = \sum_{i=1}^{j} Si \times Ni$$

The number n is determined on condition that the ratio Ra(n) of the area St(n) to the total area St(MAX) is approximately equal to 0.5.

$$Ra(n) = \frac{\sum_{i=1}^{n} Si \times Ni}{\sum_{i=1}^{MAX} Si \times Ni}$$

$$= \frac{S_1 N_1 + S_2 N_2 + \ldots + S_n N_n}{S_1 N_1 + S_2 N_2 + \ldots + S_{MAX} N_{MAX}}$$

The diameter Dn is expressed as follows.

$$Dn = 2 \times \sqrt{\frac{S_n}{\pi}}$$

This diameter Dn is set as the average size of the domain structures 4 formed in three dimensions in the cordierite article 1.

Next, a method for manufacturing the cordierite article 1 formed in a honeycomb structure will be described.

Figure 3:
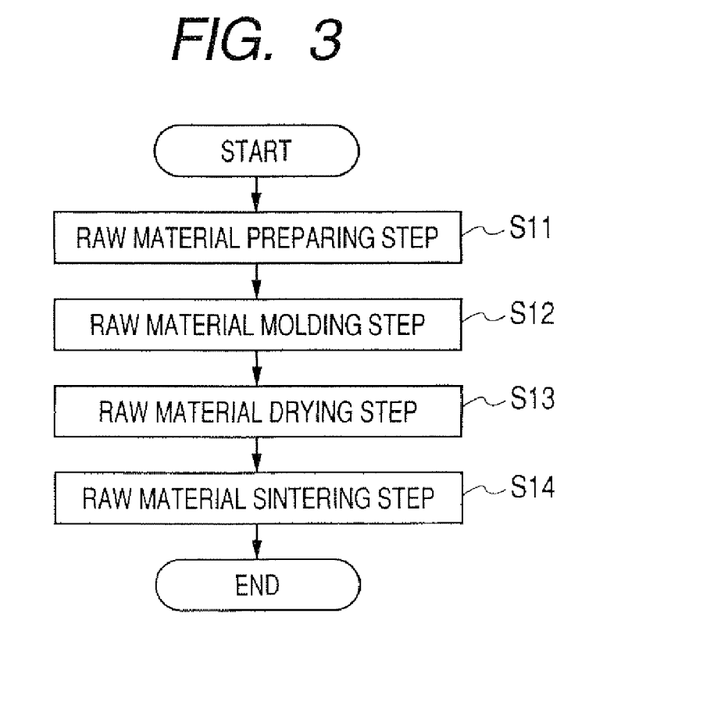
FIG. 3 is a flow chart showing a method for manufacturing the cordierite article according to the first embodiment.

FIG. 3 is a flow chart showing a method for manufacturing the cordierite article 1. As shown in FIG. 3, at step S11, raw materials for cordierite containing talc are mixed with one another to prepare a raw material for cordierite (a raw material preparing step). At step S12, the raw material for cordierite is molded in a desired form such as a honeycomb form (a raw material molding step). At step S13, the molded raw material for cordierite is dried (a raw material drying step). At step S14, the dried raw material for cordierite is sintered or fired to produce the cordierite article 1 (a raw material sintering step).

At the preparing step S11, talc, kaolin, alumina and aluminum hydroxide are mixed with one another to prepare the raw material for cordierite. As the talc, macro-crystal talc is used. This macro-crystal talc is composed of flat particles and has a specific crystal structure.

At the molding step S12, as shown in FIG. 1, the raw material for cordierite is thinned and molded in the honeycomb structure so as to have a small thickness ranging from 50 to 70 μm. The raw material for cordierite is, for example, molded according to the extrusion molding. After the raw material for cordierite is extruded in the honeycomb form, the raw material for cordierite is cut to obtain the honeycomb structure set at a desired length. Therefore, the cordierite article 1 formed in the honeycomb structure can be easily obtained at a predetermined size. Further, in this extrusion molding, the raw material for cordierite molded in the honeycomb structure can be successively obtained. Moreover, when the raw material for cordierite is thinned, the crystal grains 3 of cordierite can be easily oriented in the same direction for each domain structure 4 at the drying step S13.

At the drying step S13, the molded raw material for cordierite is heated at the temperature ranging from 80° C. to 120° C. to vaporize water produced by the chemical reaction in the raw material. The drying period of time is appropriately set while considering the size of the raw material. For example, the molded raw material for cordierite is heated at the temperature of 110° C. for one hour. This heating is performed by hot air drying, microwave drying, dielectric drying, drying under reduced pressure, vacuum drying, freeze-drying or the like. Especially, when the hot air drying and the microwave drying are combined or when the hot air drying and the dielectric drying are combined, the molded raw material can be rapidly and uniformly dried.

At the sintering step S14, the dried raw material for cordierite is sintered or fired within the temperature range from 1380° C. to 1425° C. for a period of time ranging from four to ten hours, so that the article 1 of cordierite formed in the honeycomb structure is obtained. This sintering temperature and time period are appropriately set while considering the size of the raw material for cordierite. For example, the dried raw material for cordierite is sintered at a temperature of 1420° C. for eight hours. The obtained cordierite article 1 (see FIG. 1) has the diameter of 25.4 mm and the length of 25.4 mm.

The drying step S13 and the sintering step S14 may be successively performed. In this case, the drying temperature is successively changed to the sintering temperature.

The formation of the crystal grains 3 aligned in the cordierite article 1 will be described. At the preparing and molding steps, flat particles of the macro-crystal talc are layered to form a multi-layered structure. Therefore, grains of the raw material for cordierite containing macro-crystal talc are easily oriented in a multi-layered structure. Further, when the macro-crystal talc is chemically reacted with other components of the mixture to change the mixture to cordierite, water is produced. Therefore, the cordierite is formed in the liquid phase. When the cordierite is crystallized and grown in the liquid phase, crystal grains of the cordierite are easily moved in the liquid phase and are easily aligned in the same direction in each of the microstructures to form domains 4 (see FIG. 1) having the average size ranging from 40 to 150 μm.

Therefore, when the dried raw material for cordierite is sintered, the formed article 1 of cordierite is manufactured so as to have microstructures in which domain structures 4 have the average size ranging from 40 to 150 μm, and the crystal grains 3 are substantially oriented in the same direction in each domain structure 4.

Figure 4:
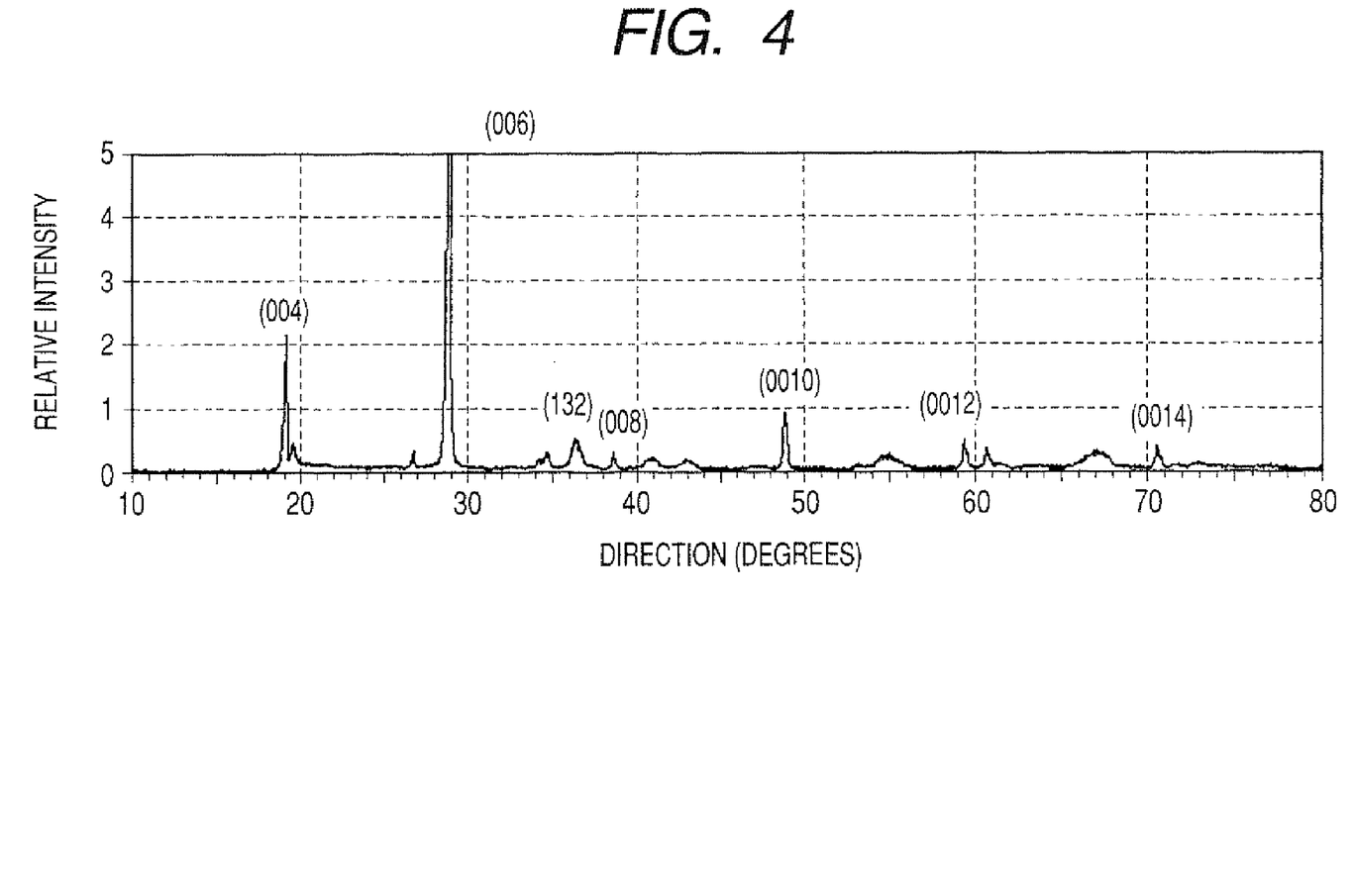
FIG. 4 is a view showing a diffraction pattern of macro-crystal talc.

The macro-crystal talc used for the cordierite article 1 will be described with reference to FIG. 4. FIG. 4 is a view showing the diffraction pattern of the macro-crystal talc.

As shown in FIG. 4, when X-rays are radiated to the macro-crystal talc from directions perpendicular to crystal lattice planes of the talc, a plurality of diffraction peaks are obtained based on X-ray diffraction. These crystal lattice planes are expressed by Miller indices. The intensity of the diffraction peak at the (006) crystal lattice plane is maximized. In macro-crystal talc used as raw material of the cordierite article 1, the ratio (111)/(006) of the intensity of the diffraction peak at the (111) crystal lattice plane (not shown) to the intensity of the diffraction peak at the (006) crystal lattice plane is lower than 0.1, and the ratio (132)/(006) of the intensity of the diffraction peak at the (132) crystal lattice plane to the intensity of the diffraction peak at the (006) crystal lattice plane is lower than 0.1. The diffraction peak of the (111) crystal lattice plane is considerably low, so that this peak is not shown in FIG. 4.

Assuming that at least the ratio (111)/(006) or the ratio (132)/(006) in the macro-crystal talc is equal to or higher than 0.1, the multi-layered structure of talc is insufficiently formed, so that the layers of talc insufficiently come off from one another. In this case, the microstructures of talc are made small. When the macro-crystal talc is changed to cordierite in the liquid phase and form the domain structures 4, the size of the domain structures 4 become small. Therefore, the thermal expansion of the cordierite article 1 undesirably becomes large.

Macro-crystal talc composed of talc particles having the average size equal to or lower than 30 μm and having calcium oxide (CaO) being equal to or less than 0.1 wt % may be used for the cordierite article 1. The average size of talc particles is measured by means of a laser type particle size distribution analyzer. Compositions of the talc are measured by means of a fluorescent X-ray analyzer. In place of the average size of talc equal to or lower than 30 μm, talc particles of macro-crystal talc may have the BET (Brunauer, Emmett, Teller) specific surface area being equal to or smaller than 4.0 m²/g.

To calculate the average size of the domains 4 in the cordierite article 1, a photograph of the domains 4 is obtained as follows. For example, the cordierite article 1 is cut or sliced to obtain a thin sample. This sample has the thickness approximately equal to or smaller than 50 μm and the area approximately equal to or larger than 25 mm². Then, the sample is placed on a preparation or a glass plate so as to be bonded with organic adhesive to the preparation or glass plate. Then, the domain structures 4 formed in the sample are observed by means of a crossed Nicol polarization microscope, and a photograph of the domain structures 4 is obtained. As a light source, a tungsten halogen lamp is used. Then, the photograph of the domain structures 4 is displayed on a display of a personal computer. For this display, the computer software program VIX2.21V/2.21.148.0 is used. Then, the diameter of each domain structure 4 is measured to obtain a distribution of diameters of the domain structures 4, and the average size Dn of the domain structures 4 is calculated.

As a result of this calculation, the inventors obtain that the average size Dn of the domain structures 4 is approximately 96.6 μm.

Next, the measurement of the mechanical strength of the cordierite article 1 will be described.

The mechanical strength of a cordierite article is generally measured by means of the three-point bending test or the four-point bending test. However, in this embodiment, the cordierite article 1 formed in the honeycomb structure has considerably thinned cell walls 11 of which the thickness ranges from 50 to 70 μm. Therefore, the cordierite article 1 is easily broken by a small shock during the manufacturing or measurement of the particle 1, so that it is difficult to correctly measure the mechanical strength of the cordierite article 1.

Figure 5:
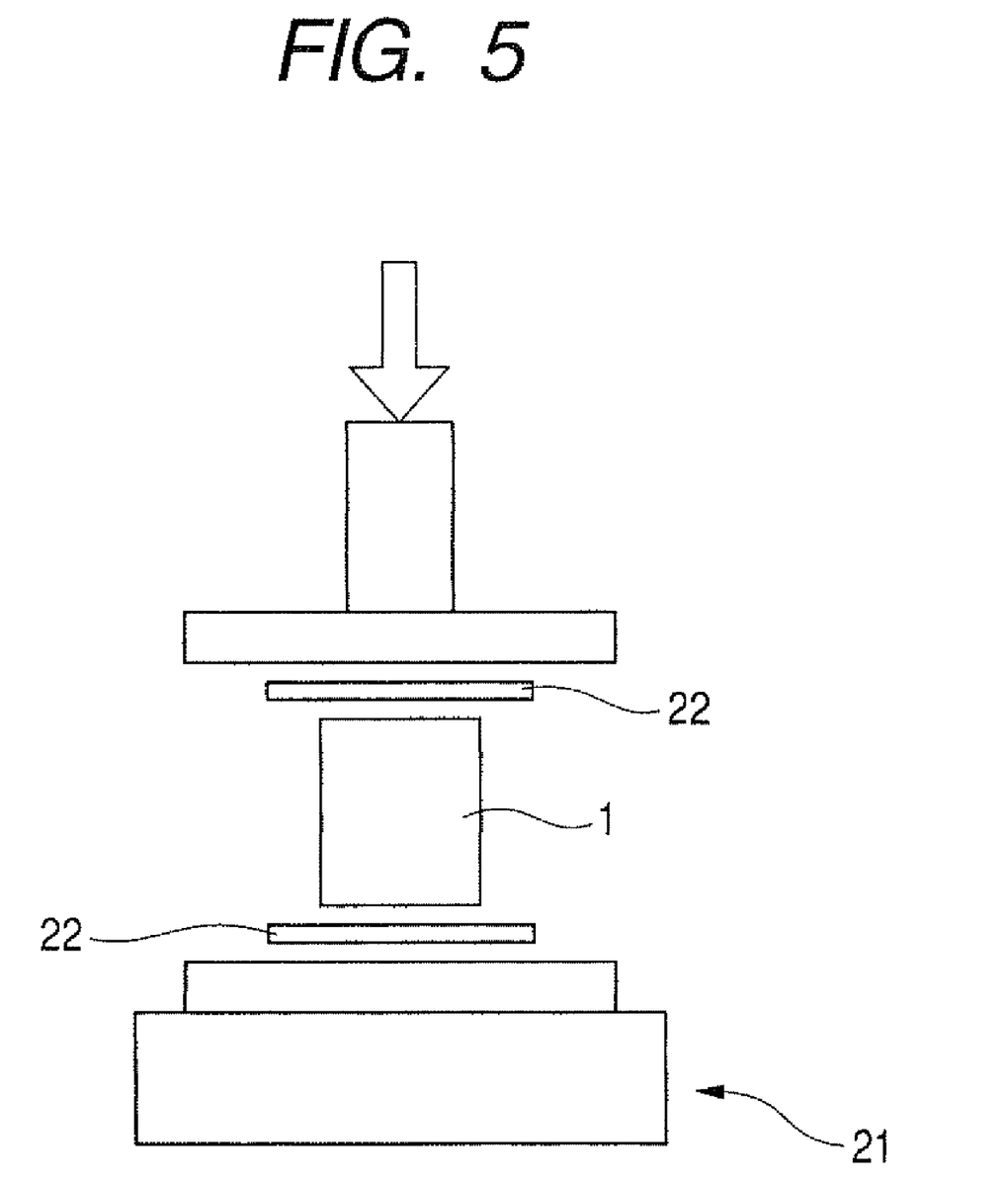
FIG. 5 is a side view of an automatic compression unit compressing the cordierite article.

To correctly measure the mechanical strength, in this embodiment, the compression method is adopted. FIG. 5 is a side view of an automatic compression unit compressing the cordierite article 1. As shown in FIG. 5, the cordierite article 1 is located into an automatic compression unit 21 through a filter paper 22 placed on each of the upper and lower surfaces of the article 1, and the article 1 is compressed at a compressing speed of 1 mm/min to obtain a maximum load applied on the article 1. This maximum load is recorded by an autograph of the compression unit 21. Then, this maximum load is divided by the area of the upper or lower surface of the article 1 to obtain the mechanical strength per unit area. As a result of this compression, the inventors found out that the cordierite article 1 had the mechanical strength of 92 MPa.

Next, the measurement of the thermal expansion in the cordierite article 1 will be described.

The cordierite article 1 is cut to have a length of 50 nm along the flow direction of exhaust gas passing through the article 1. Then, the thermal expansion of the article 1 is measured in the temperature range from 40° C. to 800° C. In this measurement, a thermo dilatometer made by Ulvac-Riko Incorporation is used. The inventors discovered that the average coefficient of the linear thermal expansion in this temperature range was $0.08 \times 10^{-6}$/K, sufficiently lower than $0.2 \times 10^{-6}$/K as required of the catalytic carrier.

Next, the measurement of the physical shape of pores in the cordierite article 1 will be described.

To measure the physical shape (i.e., volume and diameter) of pores existing in the cordierite article 1, a mercury intrusion analyzer is used. This analyzer utilizes the principal of the mercury intrusion method. More specifically, this analyzer is used to measure the volume of pores existing in a solid substance and the average diameter of the pores. Mercury hardly reacts with any solid substance and hardly gets wet. Therefore, gas such as air existing in the pores is initially removed from the pores, mercury is pressed into degassed pores of the cordierite article 1, and the relation between the applied pressure and the total volume of mercury intruded into pores of the article 1 is measured.

The volume and average diameter of the pores can be calculated from this relation and the Washburn equation: $D=-4\gamma \cos \theta /P$. This Washburn equation is expressed by the pressure P applied to mercury, the minimum diameter D of a pore possible to receive the mercury at the pressure P, surface extension $\gamma$ ($\gamma=480$ dyne cm$^{-1}$) of mercury, and angle $\theta$ ($\theta=140$ degrees) of contact at which mercury is in contact with the wall of the pores.

Because the surface extension $\gamma$ and angle $\theta$ are constant, the Washburn equation indicates the relation between the mercury pressure P and the minimum pore diameter D. Therefore, the distribution of diameters of the pores and the distribution of volumes of the pores are calculated from the Washburn equation and the total intruded volume of mercury obtained for each pressure P.

Figure 6:
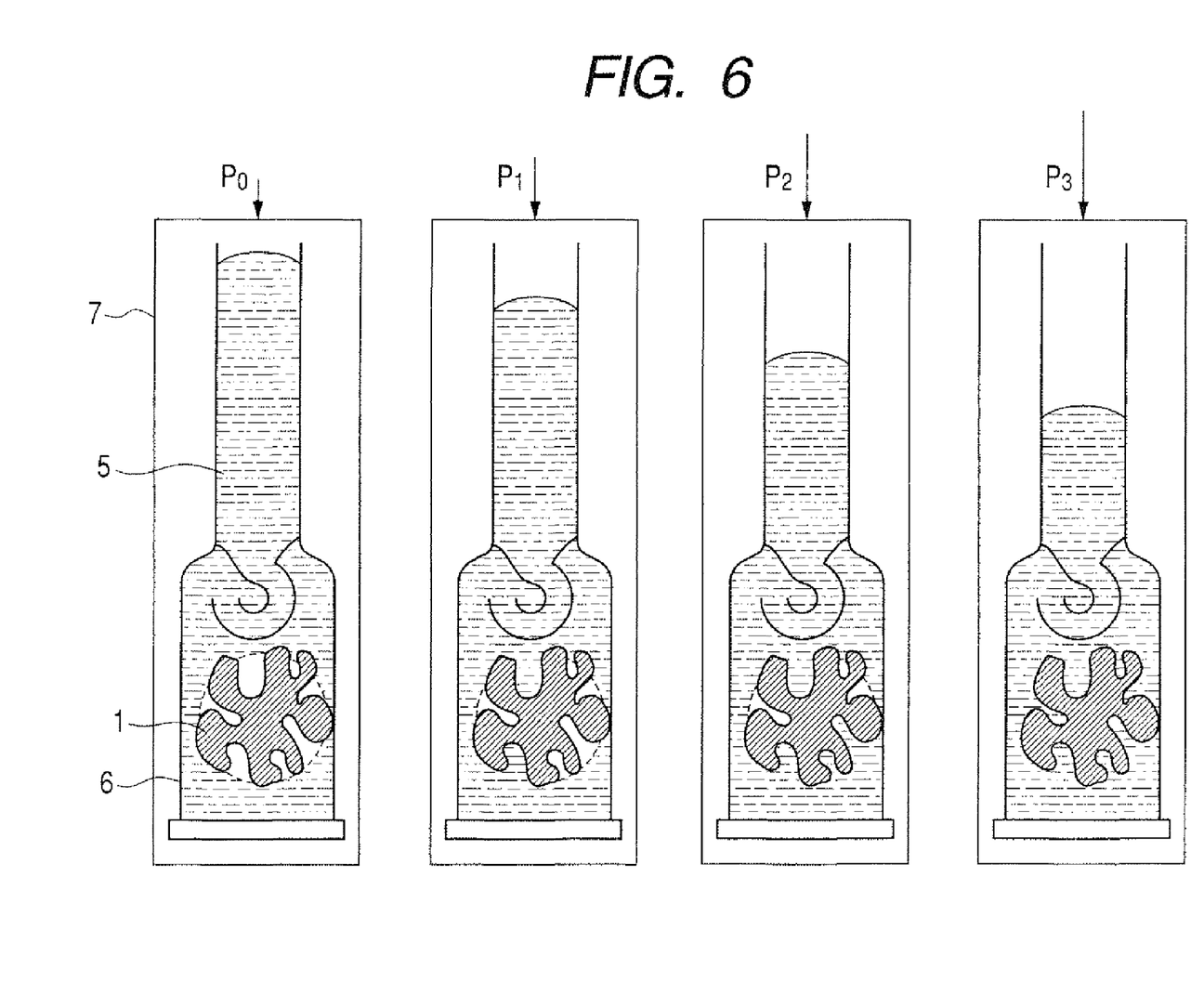
FIG. 6 is an explanatory view showing the measurement of physical shape of pores in the cordierite article.

FIG. 6 is an explanatory view showing the measurement of the physical shape of pores in the cordierite article 1.

As shown in FIG. 6, a sample cell 6 is packed with mercury 5, and a portion of the cordierite article 1 is immersed into the mercury 5 of the cell 6. Then, the cell 6 with the cordierite article 1 is put into a high pressure vessel 7. Then, the pressure of the vessel 7 is increased to a first pressure $P_0$, a second pressure $P_1$, a third pressure $P_2$ and a fourth pressure $P_3$ in that order. In this case, each time the pressure $P_i$ (i=0, 1, 2 and 3) is increased, the mercury 5 is newly intruded into pores of the article 1 of which diameters $D_i(-4\gamma \cos \theta/P_i \leq D_i < -4\gamma \cos \theta/P_{i-1})$ are smaller than diameters $D'_{i-1}(D'_{i-1} \geq -4\gamma \cos \theta/P_{i-1})$ of pores already receiving the mercury 5, and the total volume of the mercury 5 intruded into the pores of the article 1 is increased.

As a result of this measurement, the physical shape of pores in the cordierite article 1 is characterized by the volume of pores per unit weight of the article 1 being equal to 0.25 cc/g and the average diameter of the pores being equal to 4.8 µm. This physical shape of pores indicates that the porosity of the cordierite article 1 is approximately equal to 37.0%.

As described above, the formed article 1 of cordierite is manufactured so as to have microstructures, the microstructures of the cordierite article 1 have domain structures 4 set at the average size ranging from 40 to 150 µm while crystal grains 3 of cordierite are substantially oriented in the same direction in each domain structure 4. In this case, for example, in the cordierite article 1, the average coefficient of the linear thermal expansion in the temperature range from 40° C. to 800° C. is $0.08 \times 10^{-6}$/K which is sufficiently lower than $0.2 \times 10^{-6}$/K as required of the catalytic carrier, the porosity is equal to 37.0% which is placed within the range (36 to 38%) as required of the catalytic carrier, and the mechanical strength is equal to 92 MPa which is sufficiently higher than 60 MPa as required of the catalytic carrier.

Accordingly, because the cordierite article 1 forming microstructures has domain structures 4 set at the average size ranging from 40 to 150 µm while the crystal grains 3 of cordierite are substantially oriented in the same direction in each domain structure 4, the cordierite article 1 with low thermal expansion and high mechanical strength can be manufactured. Therefore, the cordierite article 1 can be used for a catalytic carrier of a particulate filter.

In this embodiment, the domain structures 4 of the cordierite article 1 have the average size ranging from 40 to 150 µm. However, the average size of the domain structures 4 may be set in a range from 50 µm to 100 µm. In this case, the cordierite article 1 can have a sufficiently low thermal expansion and a sufficiently high mechanical strength.

Second Embodiment

Three groups of samples of the cordierite article 1 were manufactured while adjusting components of the raw material for cordierite and the sintering temperature. The samples have respective average sizes of the domain structures 4. A first group of samples SA1 is set at porosity of 34%, a second group of samples SA2 is set at porosity of 36%, and a third group of samples SA3 is set at porosity of 38%.

Figure 7:
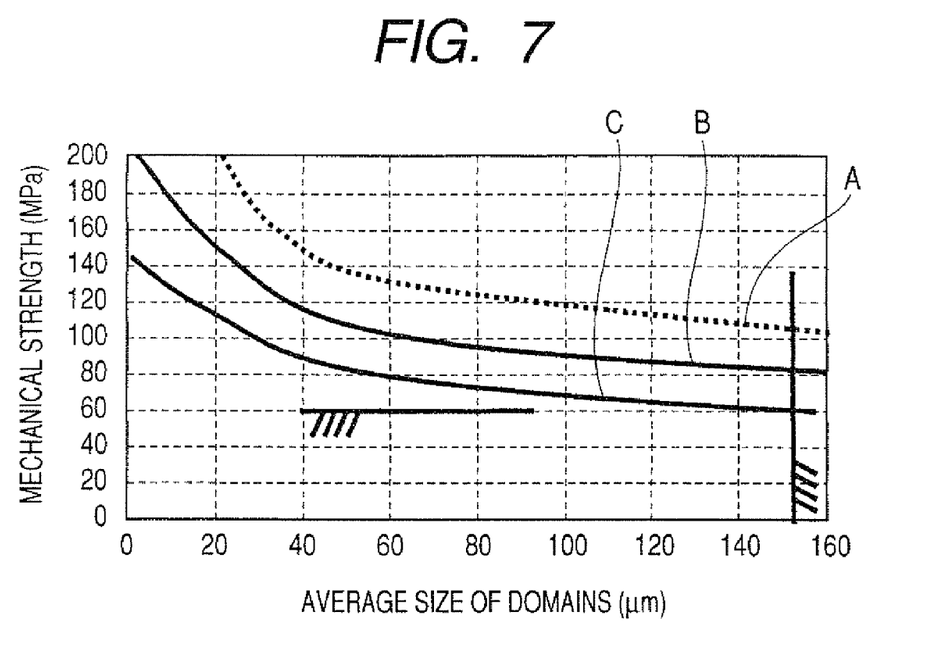
FIG. 7 is an explanatory view showing the relation between the average size of domain structures and the mechanical strength of the cordierite article according to the second embodiment of the present invention.

The mechanical strength of each sample was measured in the same manner as the measurement according to the first embodiment, and the mechanical strength changed with the average size of the domain structures 4 was examined. The examined result is shown in FIG. 7. FIG. 7 is an explanatory view showing the relation between the average size of the domain structures 4 of the cordierite article 1 and the mechanical strength of the cordierite article 1.

As shown in FIG. 7, as the porosity of the cordierite article 1 is decreased, the mechanical strength of the cordierite article 1 is increased. Further, as the average size of the domain structures 4 is increased, the mechanical strength is decreased. Because the cordierite article 1 formed in the honeycomb structure is required to have porosity ranging from 36% to 38%, it is required that the cordierite article 1 set at porosity equal to or lower than 38% has the mechanical strength required of the catalytic carrier. When the cordierite article 1 set at porosity equal to or lower than 38% has the average size of the domain structures 4 equal to or lower than 150 µm, the mechanical strength of the cordierite article 1 becomes equal to or higher than 60 MPa as required of the catalytic carrier.

Accordingly, the inventors ascertained that the cordierite article 1 set at the average size of the domain structures 4 equal to or lower than 150 µm has high mechanical strength sufficient for the catalytic carrier.

Third Embodiment

Figure 8:
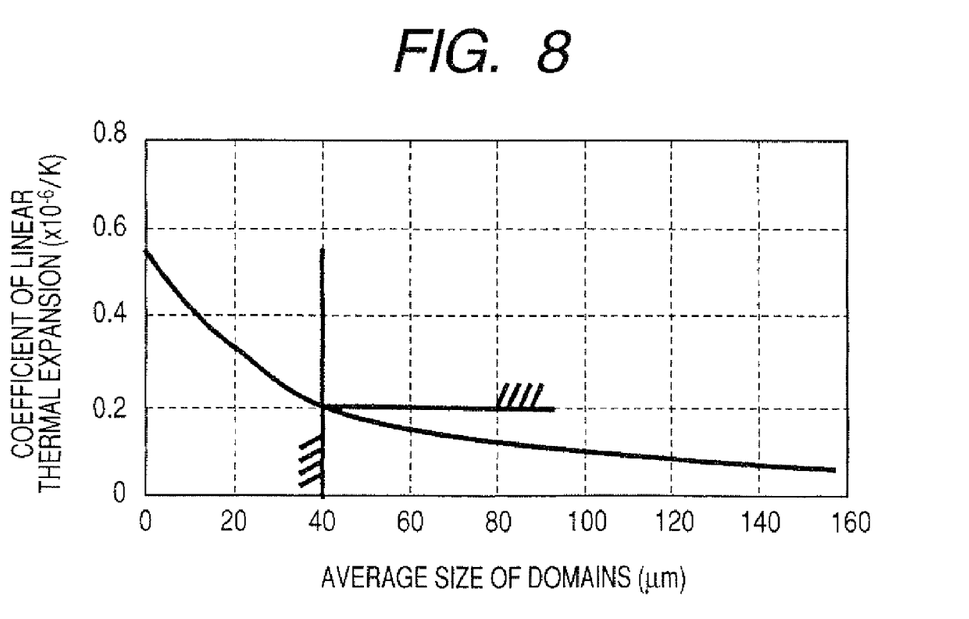
FIG. 8 is an explanatory view showing the relation between the average size of domain structures and the average linear thermal expansion coefficient of the cordierite article according to the third embodiment of the present invention.

Samples of the cordierite article 1 were manufactured while adjusting components of the raw material for cordierite and the sintering temperature. The samples have respective average sizes of the domain structures 4. Then, the average coefficient of liner thermal expansion in the temperature range from 40° C. to 800° C. was measured for each sample in the same manner as the measurement according to the first embodiment, and the thermal expansion changed with the average size of the domain structures 4 was examined. The examined result is shown in FIG. 8. FIG. 8 is an explanatory view showing the relation between the average size of the domain structures 4 of the cordierite article 1 and the average linear thermal expansion coefficient of the cordierite article 1.

As shown in FIG. 8, as the average size of the domain structures 4 is increased, the average linear thermal expansion coefficient is extraordinarily decreased. When the average size of the domain structures 4 is equal to or larger than 40 µm, the average linear thermal expansion coefficient becomes equal to or lower than $0.2 \times 10^{-6}$/K as required of the catalytic carrier.

Accordingly, the inventors ascertained that the cordierite article 1 with the average size of the domain structures 4 equal to or larger than 40 μm has a low thermal expansion coefficient sufficient for the catalytic carrier.

These embodiments should not be construed as limiting the present invention to structures of those embodiments, and the structure of this invention may be combined with that based on the prior art.

What is claimed is:

1. A formed article of cordierite, the cordierite comprising:
a plurality of domains; and
a plurality of crystal grains placed in each domain to form a domain structure, wherein
a raw material for the cordierite is macro-crystal talc,
the macro-crystal talc has a diffraction peak at each of a (006) crystal lattice plane, a (111) crystal lattice plane and a (132) crystal lattice plane in an X-ray diffraction,
a first ratio of an intensity of the diffraction peak at the (111) crystal lattice plane to an intensity of the diffraction peak at the (006) crystal lattice plane is lower than 0.1,
a second ratio of an intensity of the diffraction peak at the (132) crystal lattice plane to an intensity of the diffraction peak at the (006) crystal lattice plane is lower than 0.1,
the crystal grains in each domain are substantially aligned in the same direction, and
an average size of the domains ranges from 40 μm to 150 μm.

2. The formed article of cordierite according to claim 1, wherein the average size of the domains ranges from 50 μm to 100 μm.

3. The formed article of cordierite according to claim 1, having a plurality of cell walls formed in a honeycomb structure so as to form a plurality of cells divided by the cell walls.

4. The formed article of cordierite according to claim 3, wherein each cell wall has a thickness ranging from 50 to 70 μm.

5. The formed article of cordierite according to claim 1, wherein each crystal grain has three crystal axes, a coefficient of thermal expansion along a direction of a particular crystal axis among the crystal axes is smallest among coefficients of thermal expansion along directions of the crystal axes, and the crystal grains in each domain are aligned along the direction of the particular crystal axis.

6. The formed article of cordierite according to claim 1, wherein the cordierite has a coefficient of linear thermal expansion equal to or lower than $0.2 \times 10^{-6}$/K and a mechanical strength equal to or higher than $60 \times 10^6$ Pa.

7. The formed article of cordierite according to claim 1, wherein the cordierite has a porosity ranging from 36% to 38%.

8. The formed article of cordierite according to claim 1, wherein the cordierite has a plurality of microstructures divided by a plurality of microcracks, the domains being formed in the microstructures.

9. A method for manufacturing a formed article of cordierite, comprising the steps of:
preparing a raw material for cordierite, the raw material containing talc;
molding the raw material in a predetermined form;
drying the raw material molded in the predetermined form; and
sintering the dried raw material to obtain the formed article of cordierite, the cordierite having a plurality of domains and a plurality of crystal grains placed in each domain to form a domain structure,
wherein the crystal grains in each domain are substantially aligned in the same direction, an average size of the domains ranges from 40 μm to 150 μm, the talc is formed of macro-crystal talc, the talc has a plurality of diffraction peaks at a (006) crystal lattice plane, a (111) crystal lattice plane and a (132) crystal lattice plane in an X-ray diffraction, a first ratio of an intensity of the diffraction peak at the (111) crystal lattice plane to an intensity of the diffraction peak at the (006) crystal lattice plane is lower than 0.1, and a second ratio of an intensity of the diffraction peak at the (132) crystal lattice plane to an intensity of the diffraction peak at the (006) crystal lattice plane is lower than 0.1.

10. The method according to claim 9, wherein the step of molding the raw material includes:
extruding the raw material in a honeycomb form according to an extrusion molding.

11. The method according to claim 9, wherein the step of drying the raw material includes:
heating the raw material at a temperature ranging from 80° to 120° according to hot air drying, microwave drying, dielectric drying, drying under reduced pressure, vacuum drying or freeze-drying.

12. The method according to claim 11, wherein the raw material is heated according to either the hot air drying and the microwave drying or the hot air drying and the dielectric drying.

13. The method according to claim 9, wherein the step of sintering the dried raw material includes:
sintering the dried raw material within a temperature range from 1380° to 1425° for a period of time ranging from four to ten hours.

* * * * *

UNITED STATES PATENT AND TRADEMARK OFFICE
CERTIFICATE OF CORRECTION

| | |
|---|---|
| PATENT NO. | : 7,811,652 B2 |
| APPLICATION NO. | : 12/408146 |
| DATED | : October 12, 2010 |
| INVENTOR(S) | : Makino et al. |

It is certified that error appears in the above-identified patent and that said Letters Patent is hereby corrected as shown below:

Claim 11, at column 12, lines 35-36, "80° to 120°" should be --80°C to 120°C--.

Claim 13, at column 12, line 46, "1380° to 1425°" should be --1380°C to 1425°C--.

Signed and Sealed this
First Day of March, 2011

David J. Kappos
*Director of the United States Patent and Trademark Office*